(12) United States Patent
Lin et al.

(10) Patent No.: US 11,694,425 B2
(45) Date of Patent: Jul. 4, 2023

(54) MULTI-SPECTRUM VISUAL OBJECT RECOGNITION

(71) Applicant: International Business Machines Corporation, Armonk, NY (US)

(72) Inventors: Yue Lin, Beijing (CN); Li Cao, Beijing (CN); Jing Bai, Beijing (CN); Mu Wei, Beijing (CN); Bing Qian, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 86 days.

(21) Appl. No.: 17/315,428

(22) Filed: May 10, 2021

(65) Prior Publication Data

US 2022/0358320 A1 Nov. 10, 2022

(51) Int. Cl.
| | | |
|---|---|---|
| *G06V 10/44* | (2022.01) | |
| *G06V 10/30* | (2022.01) | |
| *G06V 10/56* | (2022.01) | |
| *G06V 10/50* | (2022.01) | |
| *G06V 10/75* | (2022.01) | |

(52) U.S. Cl.
CPC .............. *G06V 10/44* (2022.01); *G06V 10/30* (2022.01); *G06V 10/507* (2022.01); *G06V 10/56* (2022.01); *G06V 10/751* (2022.01)

(58) Field of Classification Search
CPC ...... G06V 10/44; G06V 10/56; G06V 10/751; G06V 10/30; G06V 10/507
See application file for complete search history.

(56) References Cited

U.S. PATENT DOCUMENTS

| | | | |
|---|---|---|---|
| 8,077,921 B2 * | 12/2011 | Kawasaki | G06V 20/584 382/104 |
| 8,334,513 B1 | 12/2012 | Garvey, Iii et al. | |
| 2005/0066201 A1 * | 3/2005 | Goodman | G06Q 30/02 726/19 |
| 2010/0189313 A1 | 7/2010 | Prokoski | |
| 2011/0012503 A1 * | 1/2011 | Jackson | B44F 7/00 264/319 |
| 2012/0249801 A1 | 10/2012 | Nozaki | |
| 2016/0050397 A1 * | 2/2016 | Di Giamberardino | H05B 47/175 315/149 |

(Continued)

FOREIGN PATENT DOCUMENTS

| | | | | |
|---|---|---|---|---|
| CA | 2776009 A1 * | 10/2013 | ......... | H04N 5/23241 |
| CN | 112672021 B * | 5/2022 | | |

OTHER PUBLICATIONS

Nag et al., "Detecting Items Hidden Inside a Body", Journal for Research, vol. 01, Issue 12, Feb. 2016, 6 pages.

(Continued)

*Primary Examiner* — Shaghayegh Azima
(74) *Attorney, Agent, or Firm* — James L. Olsen

(57) ABSTRACT

Aspects of the present disclosure relate to multi-spectrum visual object recognition. A first image corresponding to visible light and a second image corresponding to invisible light with respect to an object can be obtained. A first contour of the object can be identified based on the first image. A second contour of the object can be identified based on the second image. The first contour of the object and the second contour of the object can be integrated to generate a multi-spectrum contour of the object. The object can be recognized using the multi-spectrum contour of the object.

18 Claims, 9 Drawing Sheets

(56) References Cited

U.S. PATENT DOCUMENTS

2016/0073017 A1* 3/2016 Ogasawara .......... H04N 23/611
                                                        463/31
2017/0061663 A1   3/2017 Johnson et al.
2018/0316859 A1* 11/2018 Saenger Nayver ...... H04N 5/33

OTHER PUBLICATIONS

Xue et al., "Image-Based Depth-Of-Field Rendering With Non-Local Means Filtering", Jul. 2013, 6 pages.

Jeon et al., "Human Detection Based on the Generation of a Background Image by Using a Far-Infrared Light Camera", Sensors 2015, Mar. 19, 2015, 26 pages.

Mell et al., "The NIST Definition of Cloud Computing", Recommendations of the National Institute of Standards and Technology, Sep. 2011, 7 pages.

* cited by examiner

```
                                                    600
┌─────────────────────────────────────────────┐
│  GENERATE RESPECTIVE GRAY HISTOGRAMS FOR A  │
│       FIRST IMAGE AND A SECOND IMAGE        │
│                    602                      │
└─────────────────────────────────────────────┘
                      │
                      ▼
┌─────────────────────────────────────────────┐
│  COMPUTE RESPECTIVE MEDIAN VALUES OF THE GRAY│
│   LEVEL VALUES BASED ON THE GRAY HISTOGRAMS │
│    FOR THE FIRST IMAGE AND THE SECOND IMAGE │
│                    604                      │
└─────────────────────────────────────────────┘
                      │
                      ▼
┌─────────────────────────────────────────────┐
│  DETERMINE RESPECTIVE RANGES OF THE GRAY LEVEL│
│  VALUES BASED ON TWO PREDEFINED END VALUES OF│
│  GRAY LEVEL FOR THE FIRST IMAGE AND THE SECOND│
│                    IMAGE                    │
│                    606                      │
└─────────────────────────────────────────────┘
                      │
                      ▼
┌─────────────────────────────────────────────┐
│    CONVERT THE FIRST IMAGE INTO A CONTRAST-  │
│   STRENGTHENED FIRST IMAGE AND CONVERT THE  │
│  SECOND IMAGE INTO A CONTRAST-STRENGTHENED  │
│  SECOND IMAGE BASED ON THE RANGES OF THE GRAY│
│   LEVEL VALUES AND THE MEDIAN VALUES OF THE │
│              GRAY LEVEL VALUES              │
│                    608                      │
└─────────────────────────────────────────────┘
                      │
                      ▼
┌─────────────────────────────────────────────┐
│    EXTRACT THE FIRST CONTOUR BASED ON THE   │
│   CONTRAST-STRENGTHENED FIRST IMAGE AND THE │
│   SECOND CONTOUR BASED ON THE CONTRAST-     │
│         STRENGTHENED SECOND IMAGE           │
│                    610                      │
└─────────────────────────────────────────────┘
```

*FIG. 6*

MULTI-SPECTRUM VISUAL OBJECT RECOGNITION

BACKGROUND

The present disclosure relates generally to computer vision, and in particular, to multi-spectrum visual object recognition.

SUMMARY

Aspects of the present disclosure relate to a method, system, and a computer program product for multi-spectrum visual object recognition. A first image corresponding to visible light and a second image corresponding to invisible light with respect to an object can be obtained. A first contour of the object can be identified based on the first image. A second contour of the object can be identified based on the second image. The first contour of the object and the second contour of the object can be integrated to generate a multi-spectrum contour of the object. The object can be recognized using the multi-spectrum contour of the object.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 6 depicts a flow chart illustrating an exemplary contour identification method according to embodiments of the present disclosure.

Figure 1:
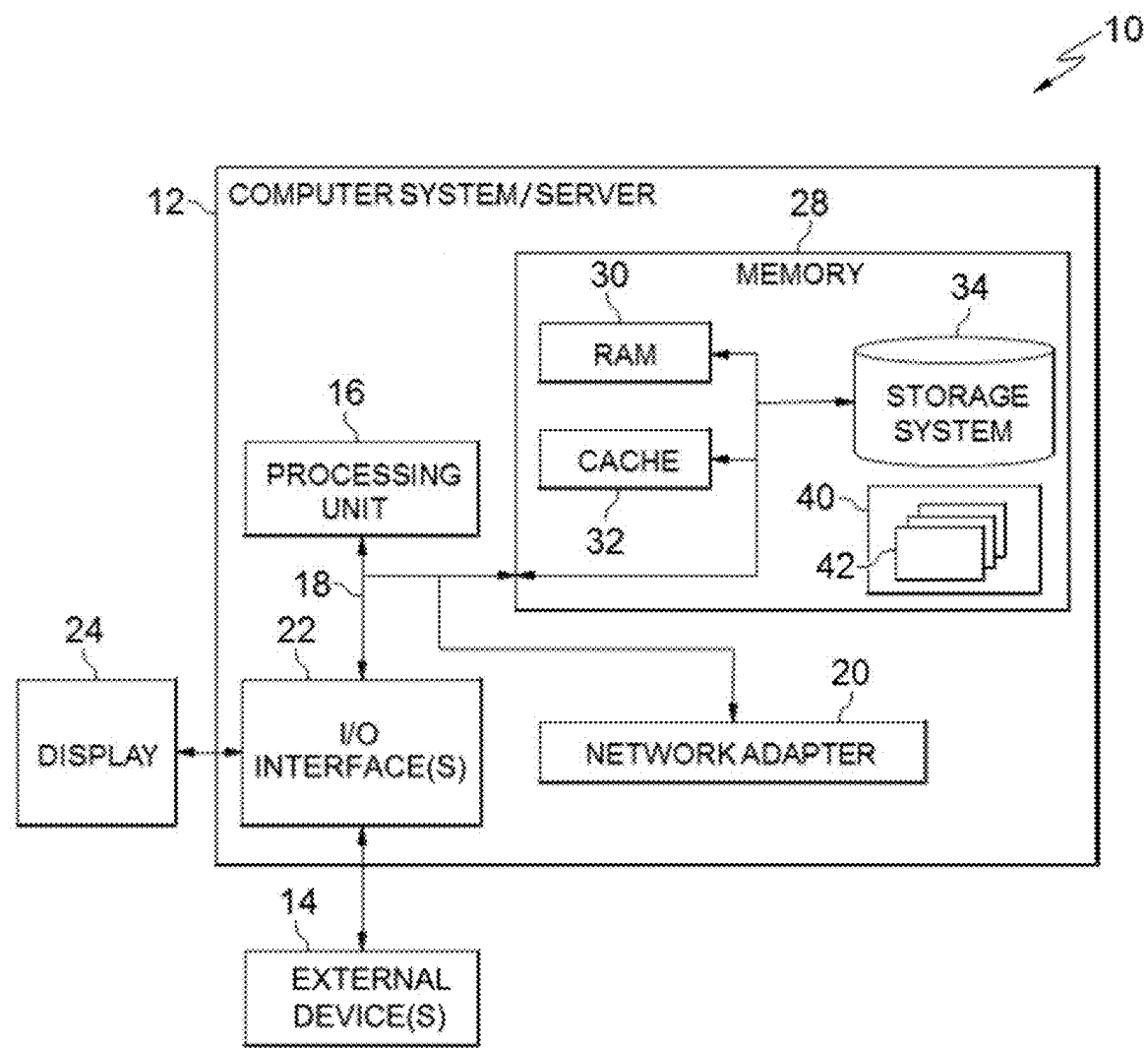
FIG. 1 depicts a cloud computing node according to embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward computer vision, and more specifically, to multi-spectrum visual object recognition. While the present disclosure is not necessarily limited to such applications, various aspects of the present disclosure may be appreciated through a discussion of various examples using this context.

There is a need for computer vision-based object detection and recognition in various fields, for instance, disease diagnosis, machine fault diagnosis, wildlife surveillance, and the like. In general, electromagnetic waves having wavelength ranges from 390 nm to 780 nm are classified into the visible light spectrum. Visible light cameras can obtain images of objects by capturing and recording visible light originating from and/or reflected by objects. The visible light enters the visible light cameras via optical channels (e.g., lenses, apertures, shutters, etc.) and is recorded by films or visible light photoelectric sensors (e.g., Charge Coupled Device (CCD) sensors, Complementary Metal-Oxide-Semiconductor (COMS) sensors, etc.).

However, performance of object detection and recognition based on visible light cameras is limited. In some scenarios, a part of an object (e.g., wildlife) is covered by obstacles (e.g., a clump of bushes, a clump of weeds, or mist) which can block visible light routes from entering visible light cameras, preventing the visible light cameras from generating accurate and intact visible light-based images of the object. Furthermore, visible light-based images may include interference factors (e.g., located in the background of the visible light-based image). For instance, a visible light-based image may include an object (e.g., wildlife) and a background portion (e.g., weeds, grass, etc.). In these instances, a large amount of data associated with the interference factors of the visible light-based image is present. As a result, the computing efficiency of a visual object recognition system can be impeded if the whole visible light-based image is directly processed for the visual object recognition, due to the large amount of data associated with the interference factors (e.g., background).

Another type of imaging used for object detection and recognition is invisible light imaging. Invisible light cameras have been widely used for such tasks such as transportation management, machine fault diagnosis, medical diagnosis, and outdoor surveillance. Invisible light cameras are classified into different types based on the wavelengths of light used in their imaging mechanisms. Invisible light imaging can include infrared (IR) cameras, X-ray cameras, ultraviolet ray cameras, and γ-ray cameras, to name a few.

The infrared (IR) spectrum can be classified into four sub-bands, near-IR (NIR) whose wavelengths range from 0.75 to 1.4 μm, short-wave IR (SWIR), whose wavelengths range from 1.4 to 3 μm, medium-wave IR (MWIR), whose wavelengths range from 3 to 8 μm, and long-wave IR (LWIR), whose wavelengths range from 8 to 15 μm. Because significant heat energy is reported to be emitted in MWIR and LWIR sub-bands, both of these sub-bands can be used for sensing heat sources, for instance, life bodies or hot machines, with or without an additional light source, and they are generally referred to as the thermal sub-bands. IR rays generally have a higher transmissibility than visible light through liquids, vapors, and organic materials (e.g., mist, fog, haze, rain, snow, clouds, plastics, resins, chemical fibers, plant fibers, plant leaves, wood planks, etc.).

Ultraviolet (UV) rays have wavelengths which range from 10 nm~400 nm. Because UV imaging has a higher sensitivity for detecting electric discharge than visible light cameras or other invisible light cameras, ultraviolet ray cameras can be used in detecting and recognizing objects which are charged.

A γ-ray has a wavelength which is less than 0.001 nm and an ultra-transmissibility through most of natural or artificial matters. X-rays have wavelengths ranging from 0.001 to 10 nm. Compared with visible light and IR rays, X-rays have a high transmissibility through various materials, for instance, organic materials (e.g., bodies), minerals, and metals. Consequently, X-ray cameras or γ-ray cameras can be used for detecting and/or analyzing objects which are covered by other objects or obstacles.

In general, invisible light cameras generate images in gray scale. This is because color information of objects is based on visible light. As a result, images generated using invisible light imaging cannot be used in scenarios where objects are detected and recognized according to their color features.

To address the aforementioned problems, aspects of the present disclosure combine visible light-based images with invisible light-based images for multi-spectrum visual object recognition herein.

Aspects of the present disclosure relate to multi-spectrum visual object recognition. A first image corresponding to visible light and a second image corresponding to invisible light with respect to an object can be obtained. A first contour of the object can be identified based on the first image. A second contour of the object can be identified based on the second image. The first contour of the object and the second contour of the object can be integrated to generate a multi-spectrum contour of the object. The object can be recognized using the multi-spectrum contour of the object.

The present disclosure may provide significant improvements on visual object recognition when objects are covered by obstacles which block visible light routes. Furthermore, the present disclosure may provide significant improvements on execution efficiency and accuracy of visual object recognition in complex scenarios where interference factors in the background influence the execution efficiency and object recognition accuracy.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are applicable over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities applicable for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made applicable to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being performed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any applicable media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination such that, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Further still, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
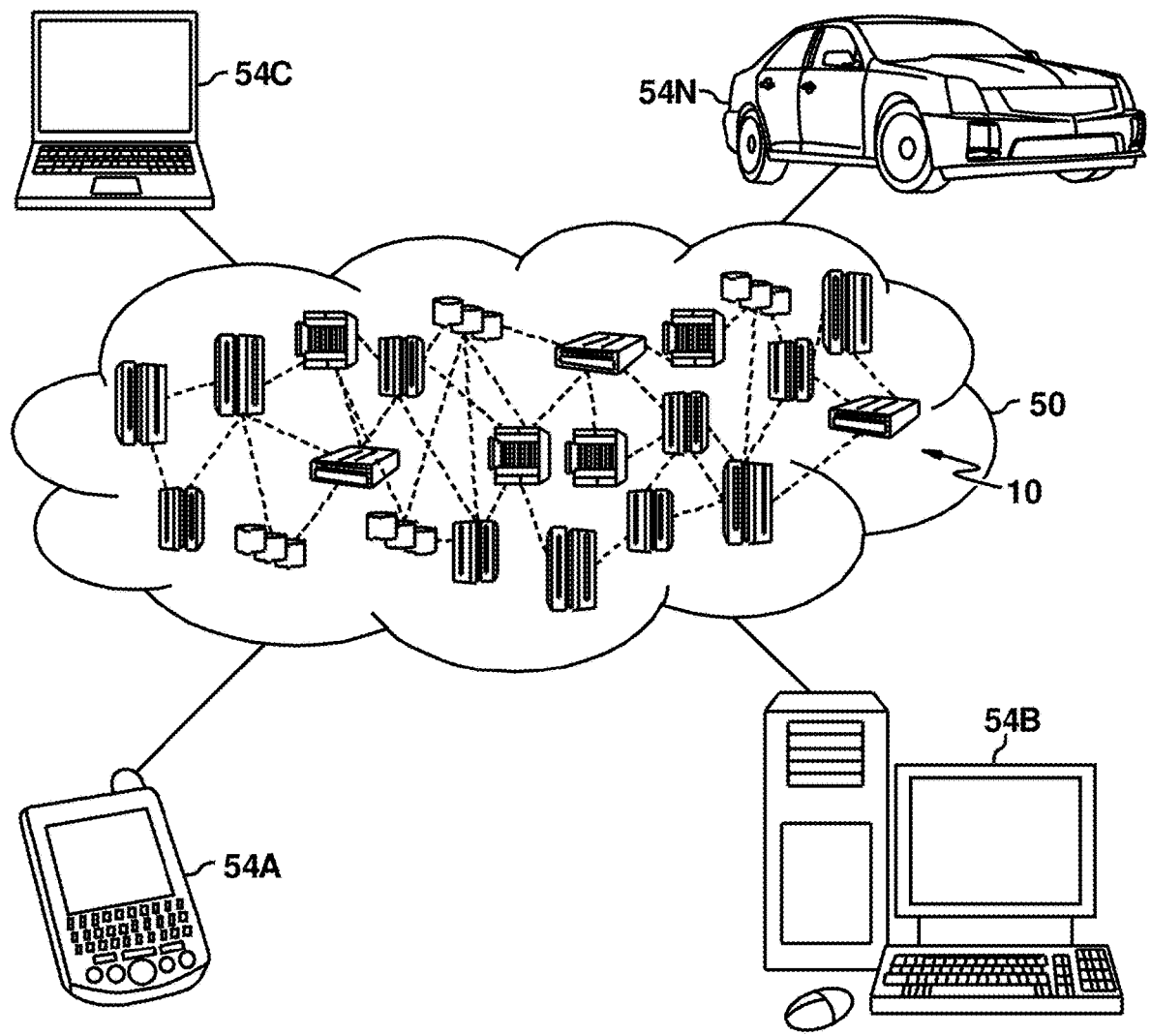
FIG. 2 depicts a cloud computing environment according to embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for instance, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination such that. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
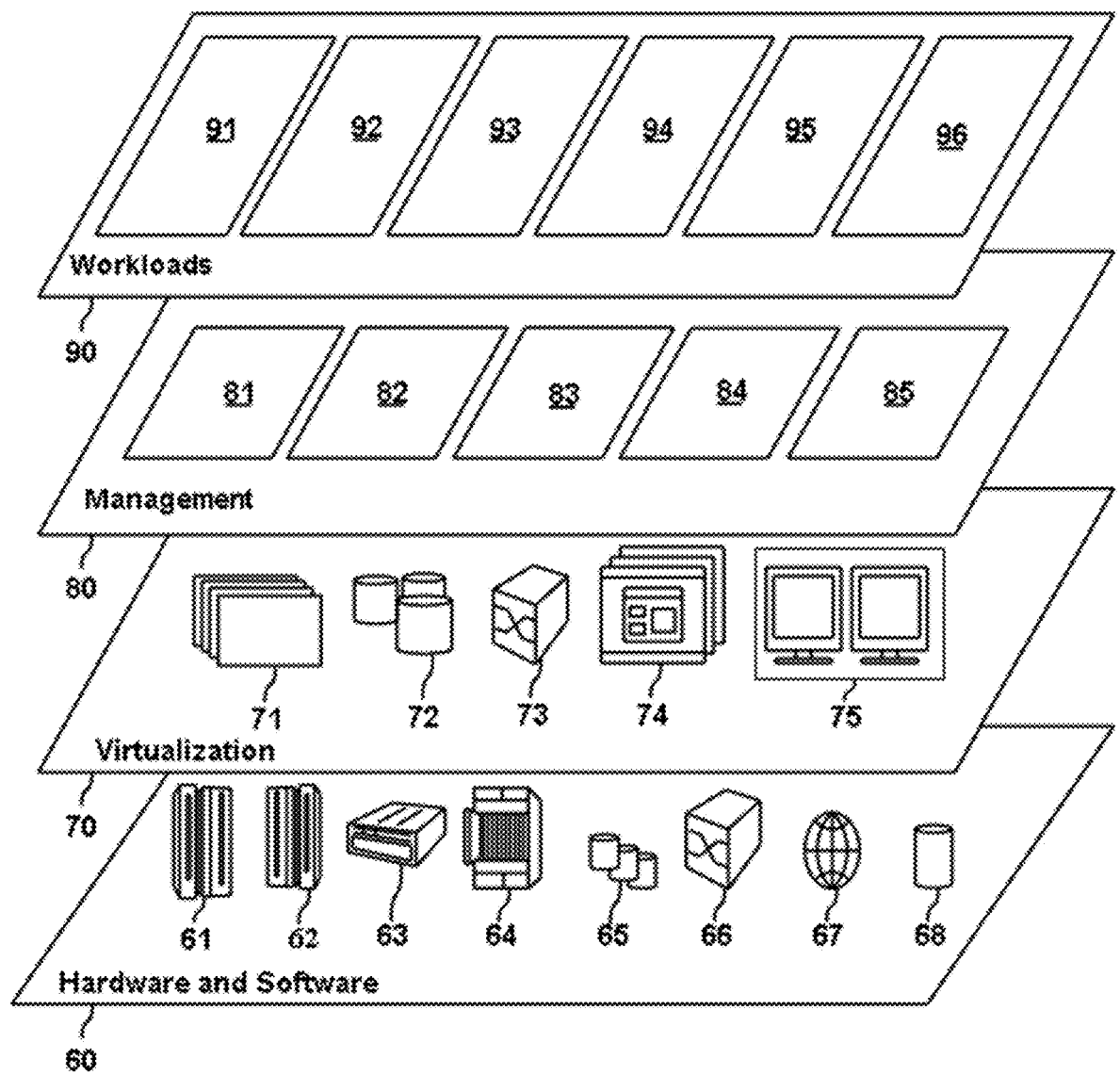
FIG. 3 depicts abstraction model layers according to embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and multi-spectrum visual object recognition 96.

Figure 4:
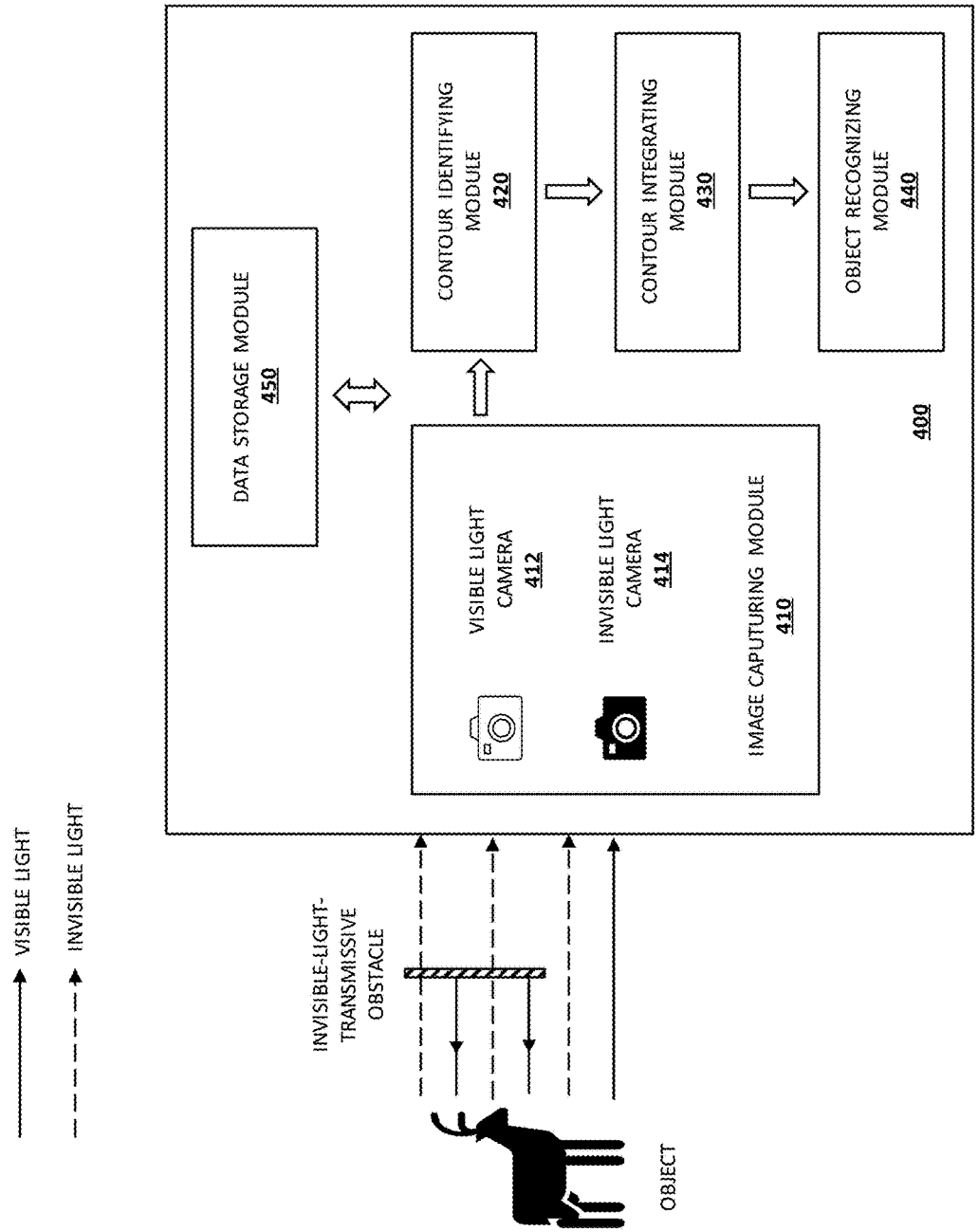
FIG. 4 depicts a block diagram illustrating an exemplary multi-spectrum object recognition system according to embodiments of the present disclosure.

Referring now to FIG. 4, shown is a block diagram illustrating an example multi-spectrum object recognition system 400, in accordance with embodiments of the present disclosure. It should be recognized that the arrangement and number of elements in FIG. 4 are exemplary. In other embodiments of the present disclosure, the multi-spectrum object recognition system 400 may include more, less, and/or different elements or modules than depicted in FIG. 4.

The multi-spectrum object recognition system 400 comprises an image capturing module 410, a contour identifying module 420, a contour integrating module 430, an object recognizing module 440, and a data storage module 450. In embodiments, the image capturing module 410, contour identifying module 420, contour integrating module 430, object recognizing module 440, and data storage module 450 can include processor executable instructions that can be executed by a dedicated or shared processor using received inputs.

The image capturing module 410 can be configured to capture and obtain visible light images using a visible light camera 412 and invisible light images using an invisible light camera 414.

The visible light camera 412 can be configured to obtain visible light-based images based on visible light. The visible light camera 412 comprises components for capturing, recording, generating, and adjusting visible light-based images, such as, for example, lenses, apertures, shutters, CCD sensors, COMS sensors, and the like. The visible light enters the visible light cameras 412 via an optical channel of the visible light cameras 412 comprising, for instance, lenses, apertures, shutters, and the like, and are recorded by films or visible light photoelectric sensors, for instance, CCD sensors, COMS sensors, or the like.

The visible light camera 412 may further comprise a processing unit for generating visible light-based images when optical information captured via the optical channel of the visible light cameras 412 is recorded by visible light photoelectric sensors. The light photoelectric sensors may receive the visible light from the optical channel of the visible light camera 412 and convert optical information of the visible light to electric signals. The processing unit (not shown) of the visible light camera 412 can process the electric signals to generate visible light based images recording the optical information of the visible light. The visible light cameras 412 may adjust various image parameters of the visible light-based images, for instance, image center points, camera angles, image magnifications, focal lengths, depths of field, exposure times, diaphragms, zooms, and the like, by optical adjustment or algorithms.

The invisible light camera 414 can utilize any suitable imaging mechanisms based on invisible light, for instance, IR cameras, X-ray cameras, ultraviolet ray cameras, γ-ray cameras, or the like. Each type of the invisible light camera 414 can include components corresponding to an imaging mechanism based on invisible light, for instance, IR cameras comprising IR optical channels, IR photoelectric sensors, and image processing units. The invisible light camera 414 may obtain invisible light-based images based on invisible light, for instance, IR rays, X-rays, ultraviolet rays, γ-rays, or the like. The invisible light cameras 414 may adjust various optical image parameters of the invisible light-based images, for instance, image center points, camera angles, image magnifications, focal lengths, depths of field, exposure times, diaphragms, zooms, and the like, by optical adjustment or algorithms.

In embodiments, the visible light camera 412 and the invisible light camera 414 can be integrated into a single component in the image capturing module 410. For example, the visible light camera 412 and the invisible light camera 414 can share a common optical channel and image processing unit. Furthermore, the image capturing module 410 may obtain visible light-based images and invisible light-based images of same objects simultaneously by the shared component. In these embodiments, the visible light-based images and the invisible light-based images may share the same, or a substantially similar, image center point, camera angle, and image magnification.

In embodiments, the visible light camera 412 and the invisible light camera 414 can be implemented by two independent components in the image capturing module 410. For instance, the visible light camera 412 and the invisible light camera 414 can utilize independent optical channels, photoelectric sensors, and image processing units. The visible light camera 412 may obtain visible light-based images and the invisible light camera 414 may obtain invisible light-based images. By adjusting optical image parameters of the visible light-based images and the invisible light-based images according to predefined requirements, the visible light-based images and the invisible light-based images can share similar properties (e.g., center point, camera angle, and image magnification) with respect to a captured object.

As shown in FIG. 4, the multi-spectrum object recognition system 400 further comprises the contour identifying module 420. The contour identifying module 420 can be communicatively connected with the image capturing module 410. The visible light-based images and the invisible light-based images obtained respectively by the visible light camera 412 and the invisible light camera 414 can be transferred to the contour identifying module 420 for contour identification. The contour identifying module 420 may identify a first contour (e.g., outline) of a captured object recorded in a visible light-based image. In some instances, the object may be covered at least in part by an obstacle (e.g., a clump of weeds), which may block visible light from entering the visible light camera 412. As a result, the visible light camera 412 may be unable to generate an accurate and intact visible light-based image of the object covered at least in part by the obstacle. In these instances, the first contour of the object identified by the contour identifying module 420 may be identified based on the portion of the object that is visible.

Furthermore, the contour identifying module 420 may identify a second contour of the object in an invisible light-based image captured by the invisible light camera 414. The object may be covered at least in part by the obstacle which blocks visible light and thus cannot be captured by the visible light camera 412. However, it may not be blocked by invisible light which can be captured by the invisible light camera 414. The obstacle, which can be captured by invisible light, can be referred to as an invisible light-transmissive obstacle herein. Accordingly, the invisible light camera 414 may generate an accurate and intact invisible light-based image from invisible light transmitted from the object even if the object is covered at least in part by the obstacle. As a result, the second contour identified by the contour identifying module 420 may not be hindered by the invisible light-transmissive obstacle.

As shown in FIG. 4, the multi-spectrum object recognition system 400 further comprises the contour integrating module 430. The contour integrating module 430 can be communicatively coupled with the contour identifying module 420. The visible light-based image and the invisible light-based image, from which the first and second contours are identified, can be transferred to the contour integrating module 430 for contour integration. The contour integrating module 430 may integrate the first contour and the second contour to generate a multi-spectrum contour of the object image. At least a first portion of the multi-spectrum contour is extracted from the second contour based on the invisible light, and at least a second portion of the multi-spectrum contour of the object is extracted from the first contour based on the visible light.

In embodiments of the present disclosure, the contour integrating module 430 may merge the visible light-based image comprising the first contour and the invisible light-based image comprising the second contour to generate a multi-spectrum image based on shared image properties (e.g., an image center point) of the visible light-based image and the invisible light-based image.

The contour integrating module 430 may further section, respectively, the first contour into a first set of contour differential elements and the second contour into a second set of contour differential elements based on a coordinate system in the multi-spectrum image. The first set of contour differential elements and the second set of contour differential elements can have a same differential element amount n and a same differential element angle Δθ based on the coordinate system as shown in FIG. 9.

Figure 9:
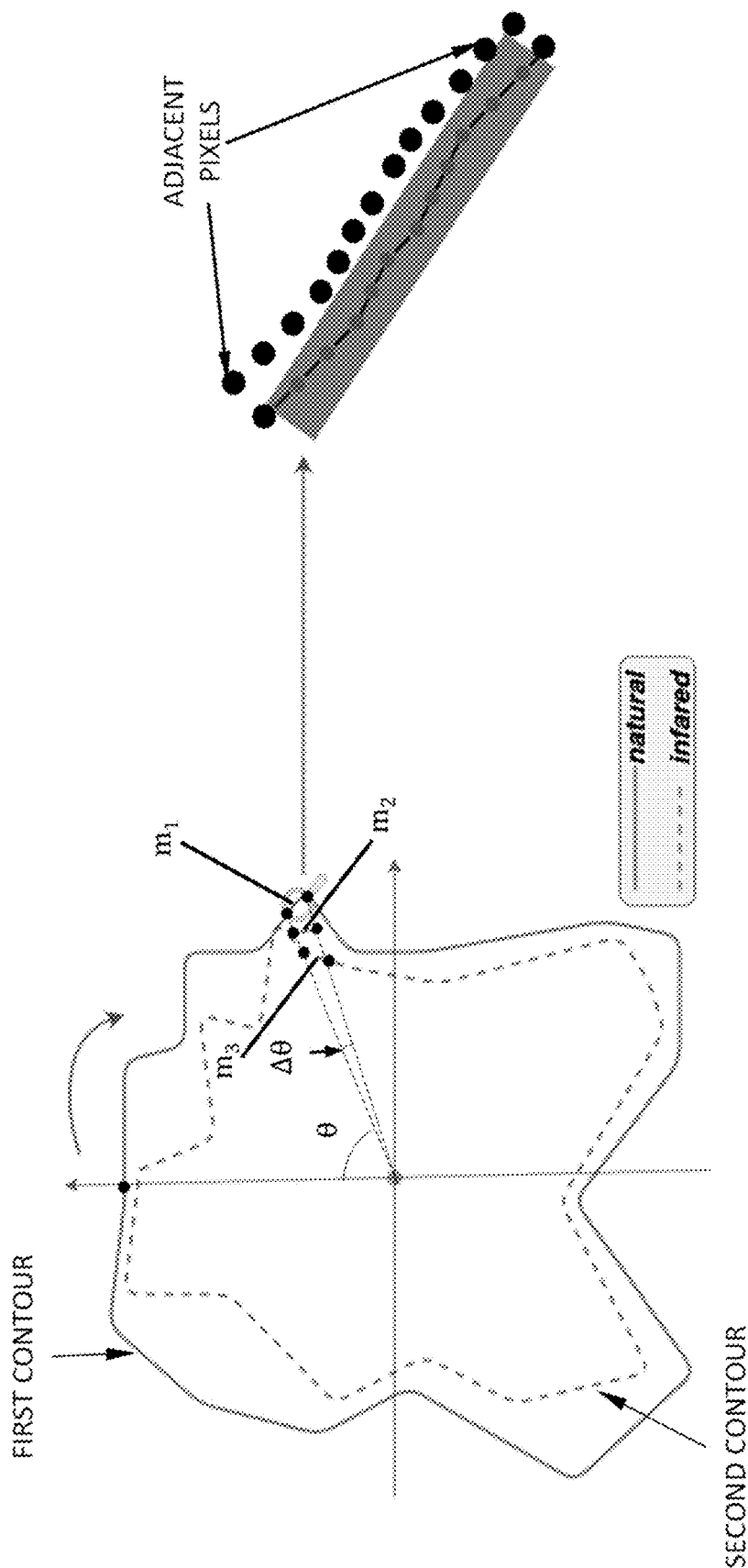
FIG. 9 depicts a schematic diagram illustrating an exemplary contour integrating method according to embodiments of the present disclosure.

The contour integrating module 430 may further calculate a set of color difference values between each element of the first set of contour differential elements and adjacent pixels corresponding to each element of the first set of contour differential elements based on color information (e.g., Red, Blue, Green (RBG) pixel bit values) of the first set of contour differential elements and color information of the adjacent pixels as shown in FIG. 9.

The contour integrating module 430 may further compare a value of the set of color difference values with a first predefined color difference threshold value (e.g., a pixel bit value difference threshold, "TH1"). The contour integrating module 430 may further replace an element of the first set of contour differential elements corresponding to the value of the set of color difference values with a corresponding element of the second set of contour differential elements in response to determining that the value of the set of color difference values is less than the first predefined color difference threshold value.

The element of the first set of contour differential elements and the corresponding element of the second set of contour differential elements may have a same deflection angle θ in the coordinate system as shown in FIG. 9. The contour integrating module 430 may further compare the value of the set of color difference values with a second predefined color difference threshold value (TH2) in response to determining that the value of the set of color difference values is not less than the first predefined color difference threshold value, where the second predefined color difference threshold (TH2) is greater than the first predefined color difference threshold (TH1).

The contour integrating module 430 may further replace the element of the first set of contour differential elements corresponding to the value of the set of color difference values with a middle contour differential element. The position of the middle contour differential element in the multi-spectrum image can be determined based on the following factors: a position of the element of the first set of contour differential elements, a position of the corresponding element of the second set of contour differential elements, and a predefined position weight factor. The predefined position weight factor is related to a variation tendency of the color difference value corresponding to the element of the first set of contour differential elements (see Equation 1, presented below).

In response to the value of the set of color difference values being greater than both of the first predefined color difference threshold value and the second predefined color difference threshold value, the contour integrating module 430 may skip the replacing step and return to execute the comparing step until all color difference values in the set of color difference values have been traversed. The contour integrating module 430 may iteratively perform the comparing with a next value of the set of color difference values until all of the set of color difference values are traversed. The contour integrating module 430 may further integrate unreplaced elements of the first set of contour differential elements and elements of the second set of contour differential elements replaced into the first contour to generate the multi-spectrum contour of the object.

As shown in FIG. 4, the multi-spectrum object recognition system 400 further comprises the object recognizing module 440. The object recognizing module 440 is communicatively coupled with the contour integrating module 430. The visible light-based images within the multi-spectrum contour of the object, which are integrated by the contour integrating module 430, can be transferred to the object recognizing module 440 for recognizing the object in the visible light-based image by using a virtual region to indicate the object. The virtual region is defined by the multi-spectrum contour of the object and marked for indicating appropriate information of objects, for instance, sharpness, position, color, volume, velocity, species, and the like. It should be noted that the object recognizing module 440 can be implemented by using various applicable object recognizing methods and/or algorithms (e.g., convolutional neural networks (CNNs), speeded up robust features (SURF), scale-invariant feature transform (SIFT), geometric hashing, invariance, pose clustering, edge matching, etc.) based on object contours which are not exhaustively covered for the sake of brevity.

The multi-spectrum object recognition system further includes a data storage module 450 for storing image data and/or other data generated by other modules. The data storage module 450 can be communicatively coupled with one or more components/modules included in the multi-spectrum object recognition system 400 for receiving, sending and storing data. The data storage module 450 may be a local storage device in the multi-spectrum object recognition system 400, for instance, a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, or the like. The data storage module 450 may be a remote storage device connected with and allocated to the multi-spectrum object recognition system 400 through compatible connection ways, for example, a network hard disk, a cloud storage service system, a Peer-to-Peer storage system, or the like.

Though the multi-spectrum object recognition system 400 depicted in FIG. 4 is described as including the aforementioned modules, there is no limitation provided to the modules or elements comprised in the multi-spectrum object recognition system 400. The multi-spectrum object recognition system 400 may comprise other modules or elements for implementing more functionalities and objectives. The contour identifying module 420, the contour integrating module 430 and the object recognizing module 440 may be implemented by hardware components and/or software packages executed on one or more processing units corresponding to functions, operations, or actions described in the present disclosure.

In embodiments, the multi-spectrum object recognition system 400 is implemented in a distributed computing environment, for instance, a cluster computing environment, a grid computing environment, a server/client network computing environment, a cloud computing environment, etc. A distributed computing environment can implement the multi-spectrum object recognition system 400 by components of the distributed computing environment comprising hardware, software, or a combination thereof. According to performance and capability based on a distributed computing environment, the multi-spectrum object recognition system 400 can perform the computer-implemented method for visual object recognition described herein.

In embodiments, the multi-spectrum object recognition system 400 may be deployed on remote computing platforms, for instance, a cloud computing platform and/or a cloud storage service system which can provide remote computing resource to implement at least some of the functionalities of the multi-spectrum object recognition system 400 and provide respective computing resources, information resource, or supporting services. In these embodiments, the remote computing platforms may be resilient and adapted to computing performance, storage capacity, response speed, display effect, and the like.

In some embodiments of the present disclosure, components/modules of the multi-spectrum object recognition system 400 may be in communication with each other by means of electronic or wireless connections, for instance, cables, buses, local area network (LAN), general wide area network (WAN), public network (e.g., the Internet), Wi-Fi network, Bluetooth connection, or a combination thereof.

It is noted that the multi-spectrum object recognition system 400 could be implemented by computer system/server 12 as shown in FIG. 1 and distributed cloud computing environment 50 as shown in FIGS. 2 and 3. For example, a plurality of cloud computing nodes 10 perform the process management in distributed cloud computing environment 50 which further comprise respective cloud components implementing functions. Here, the multi-spectrum object recognition system 400 is exemplarily and abstractly illustrated by a block diagram which does not explicitly exhaust or precisely limit components of the multi-spectrum object recognition system 400 as shown in FIG. 4. Furthermore, it would be recognized that the number and arrangement of elements or modules (the number of elements or modules and the arrangement thereof) in FIG. 4 are provided for the purpose of illustration only. An element or module can also be merged with other elements or modules to construct a new element or module which can implement all functions of the merged elements or modules. Conversely, elements or modules can be split into two or more independent elements or modules which respectively implement a part of functions of the element or module.

Figure 5:
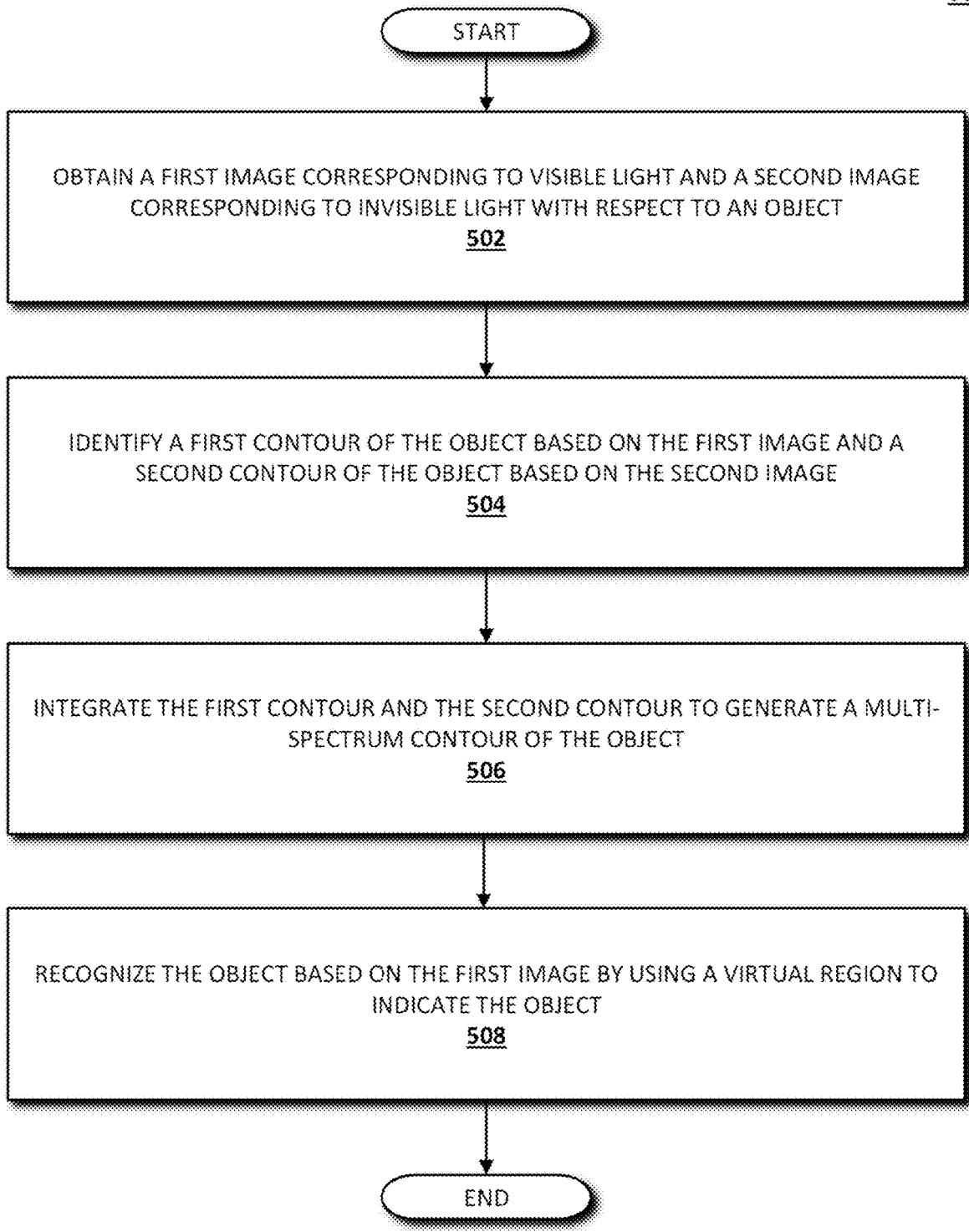
FIG. 5 depicts a flow chart illustrating an exemplary multi-spectrum object recognition method according to embodiments of the present disclosure.

With reference now to FIG. 5, shown is a flow-diagram of an example method 500 for multi-spectrum visual object recognition, according to embodiments of the present disclosure. The method 500 can be implemented by the multi-spectrum object recognition system 400 described herein, by one or more processors, and/or by components in a cloud computing system as shown in FIGS. 1, 2 and 3.

Method 500 initiates at operation 502, where a first image (a visible-light-based image) corresponding to visible light (e.g., natural light) and a second image (an invisible light-based image) corresponding to invisible light (e.g., IR rays) with respect to an object (e.g., an organism) are obtained. In embodiments, the object may be covered at least in part by an invisible light-transmissive obstacle (e.g., mist). In embodiments, the first image and the second image can have a same image center point, camera angle, and image magnification.

A first contour of the object based on the first image is identified and a second contour of the object based on the second image is identified. This is illustrated at operation 504. In embodiments, the first image may be covered at least in part by the invisible light-transmissive obstacle and the second contour may not be obstructed by the invisible-light-transmissive obstacle. In embodiments, contour identification can be completed in the same, or a substantially similar manner, as described with respect to FIGS. 6-7.

The first contour and the second contour can be integrated to generate a multi-spectrum contour of the object. This is illustrated at operation 506. In embodiments at least a part of the multi-spectrum contour is from the second contour and the rest of the multi-spectrum contour is from the first contour. In embodiments, the first and second contours can be integrated to generate the multi-spectrum contour in a manner shown and described with respect to FIG. 9. In embodiments, contour integration can be completed using the same, or substantially similar, techniques as described with respect to FIGS. 8-9.

The object based on the first image can be recognized by using a virtualized region to indicate the object. This is illustrated at operation 508. In embodiments, the virtualized region can be defined based on the multi-spectrum contour.

The aforementioned operations can be completed in any order and are not limited to those described. Additionally, some, all, or none of the aforementioned operations can be completed, while still remaining within the spirit and scope of the present disclosure.

With reference now to FIG. 6, shown is a flow-diagram of an example method 600 for contour identification, according to embodiments of the present disclosure. The exemplary method 600 can be implemented by a computing system such as multi-spectrum object recognition system 400 shown in FIG. 4, by one or more processors, and/or by components in a cloud computing system as shown in FIGS. 1, 2 and 3. In some embodiments, the method 600 can be included within operations of method 500 shown in FIG. 5 (e.g., operation 504).

Method 600 initiates at operation 602, where respective gray histograms for a first image (e.g., based on a visible light-based image captured by a visible light camera) and a second image (e.g., based on an invisible light-based image captured by an invisible light camera) are generated. In embodiments, the gray histogram comprises gray level values (e.g., pixel bit values), for instance, ranging from 0 to 255, and a number of pixels corresponding to each of the gray level values (e.g., see histograms (a) and (b) of FIG. 7).

Respective median values of the gray level values based on the gray histograms for the first image and the second image are computed. This is illustrated at operation 604.

A range of the gray level values are determined based on two predefined endpoint values of gray level (e.g., 70-180), respectively, corresponding to the first image and the second image. This is illustrated at operation 606. The median value (e.g., 127.5) of the gray level values is within the range of the gray level values.

The first image and the second image are converted into a contrast-strengthened first image and a contrast-strengthened second image, respectively, based on the respective range of the gray level values and the median value of the gray level values. This is illustrated at operation 608.

The first contour based on the contrast-strengthened first image and the second contour based on the contrast-strengthened second image are extracted. This is illustrated at operation 610. In some embodiments, the first contour and the second contour comprise a respective set of pixels defining a boundary of an object.

The aforementioned operations can be completed in any order and are not limited to those described. Additionally, some, all, or none of the aforementioned operations can be completed, while still remaining within the spirit and scope of the present disclosure.

Figure 7:
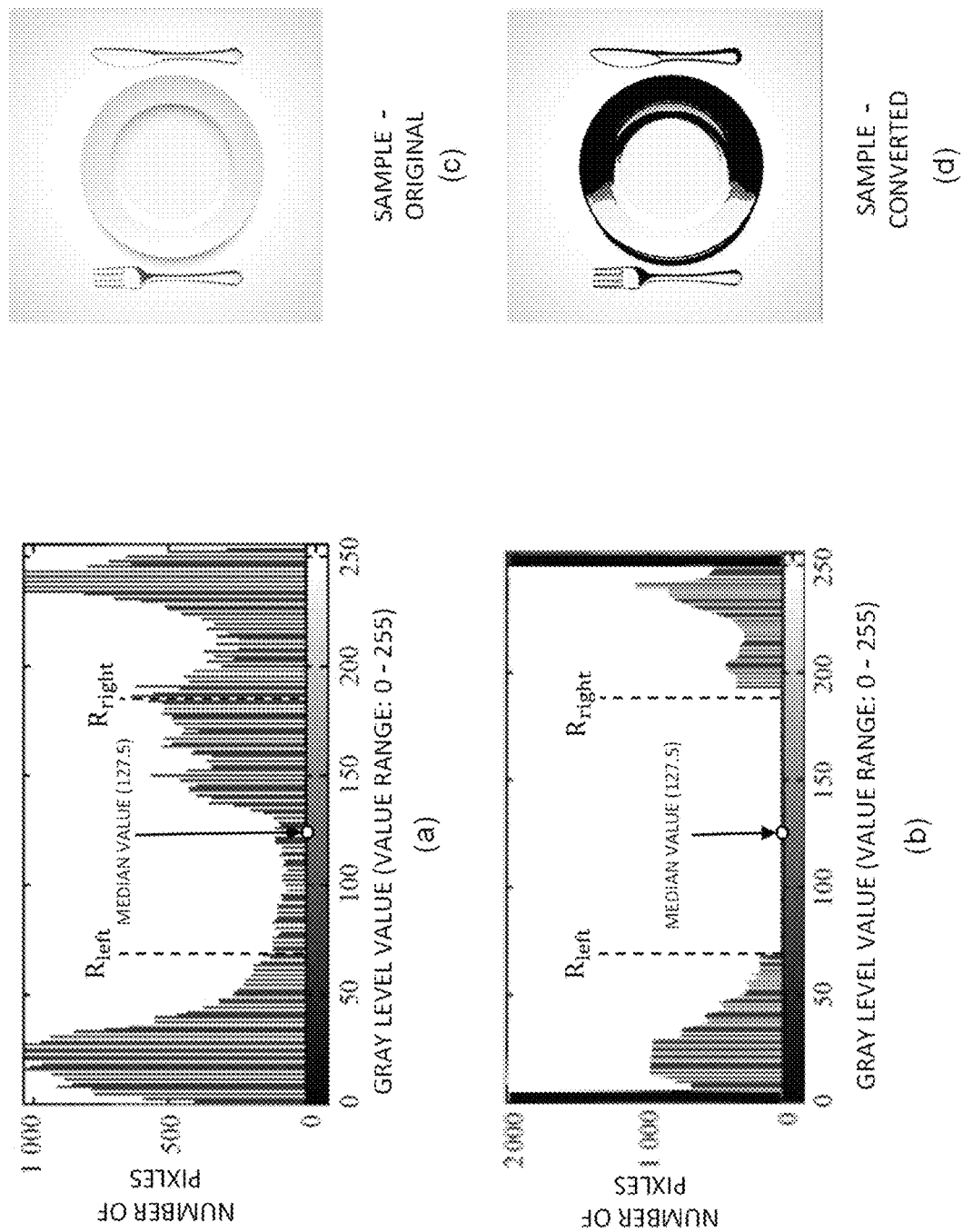
FIG. 7 depicts a schematic diagram illustrating an exemplary contour identification method according to embodiments of the present disclosure.

With reference now to FIG. 7, an embodiment of the method for contour identification described in method 600 is depicted. A gray histogram (marked by a symbol "(a)" as shown in FIG. 7) of an image sample (marked by a symbol "(c)" as shown in FIG. 7) is depicted. The image sample (c) shown in FIG. 7 is an original black-and-white photograph illustrating a dish, a fork, and a table-knife. The multi-spectrum object recognition system 400 may generate the gray histogram (a) corresponding to the image sample (c). The x-axis of the gray histogram (a) indicates gray level values which range from 0 to 255. The y-axis of the gray histogram (a) indicates a number of pixels corresponding to each of the gray level values. For example, coordinate point (25, 1000) in the gray histogram (a) indicates that the number of pixels corresponding to the gray level value 25 is 1000 in the image sample (c). It should be noted that the gray histogram corresponding to an image, for instance, a visible-light-based image or an invisible-light-based image mentioned above, can be generated by using various applicable image processing methods and/or algorithms based on gray levels of the image which are omitted herein for the sake of brevity.

As shown in FIG. 7, the multi-spectrum object recognition system 400 may compute a median value of the gray level values based on the gray histogram (a) respectively corresponding to the image sample (c). In some embodiments, the median value of the gray level values can be calculated as an arithmetic mean value of gray level values. For example, the median value of the gray level values is 127.5, which is the arithmetic mean value of the gray level values ranging from 0 to 255. In other embodiments, the multi-spectrum object recognition system 400 may compute the median value of the gray level values based on the range of the gray level values and the number of pixels corresponding to each of the gray level values. For example, the median value of the gray level values can be equal to the gray level value which has the minimum number of pixels in all of the gray level values. However, it should be noted that various available methods or algorithms for computing a median value can be implemented.

Furthermore, the multi-spectrum object recognition system 400 can determine a range of the gray level values based on two predefined end values of gray level (referred to as $R_{left}$ and $R_{right}$ in FIG. 7). The value of $R_{left}$ is less than the median value of the gray level values, and the value of $R_{right}$ is more than the median value of the gray level values. As such, the median value of the gray level values is within the range of the gray level values defined by the two endpoint values $R_{left}$ and $R_{right}$. The multi-spectrum object recognition system 400 may determine $R_{left}$ and $R_{right}$ based on a predefined condition. In some embodiments, the predefined condition is defined as a difference value between $R_{left}$ and the median value or between $R_{right}$ and the median value. As an example, the difference value may be predefined as 15 and the median value may be predefined as 127.5. Following this example, the corresponding range of the gray level values is [112.5, 142.5].

In some embodiments, the predefined condition is defined as a percentage which indicates a proportion of pixels comprised in the corresponding range of the gray level values compared with all pixels in an image. For example, if the predefined condition is defined as 20%, then the range of gray level values will be defined such that 20% of the pixels will be included in the range. In some embodiments, the predefined condition is a threshold value on gradients of the number of pixels corresponding to the gray level values. However, it should be noted that the multi-spectrum object recognition system 400 may determine the range of the gray level values by using any suitable method and is not to be limited by the embodiments described herein.

The multi-spectrum object recognition system 400 may convert the image sample (c) to a converted image sample (marked by a symbol "(d)" as shown in FIG. 7) by changing gray level values of pixels according to their placement within the range. For example, pixels within the range $R_{left}$-$R_{median}$ [112.5, 127.5] can be converted to a gray level of 0 and pixels in the range $R_{median}$-$R_{left}$ [127.5, 142.5] can be converted to a gray level of 255. The converted gray histogram (marked by a symbol "(b)" as shown in FIG. 7) corresponding to the converted image sample (d) is depicted in FIG. 7.

As shown in FIG. 7, the converted image sample (d) has a strengthened contrast, making it easier to detect and recognize object contours than the image sample (c). The multi-spectrum object recognition system 400 may further extract the object contours based on the contrast-strengthened image sample (d).

It should be noted that the method for contour identification described in FIGS. 6-7 may be used to identify both of visible light-based images and invisible light-based images.

In some embodiments of the present disclosure, the exemplary method for contour identification may further comprise removing background interference based on contour. The background interference may be designated as located outside of a region bounded by their contour.

Figure 8:
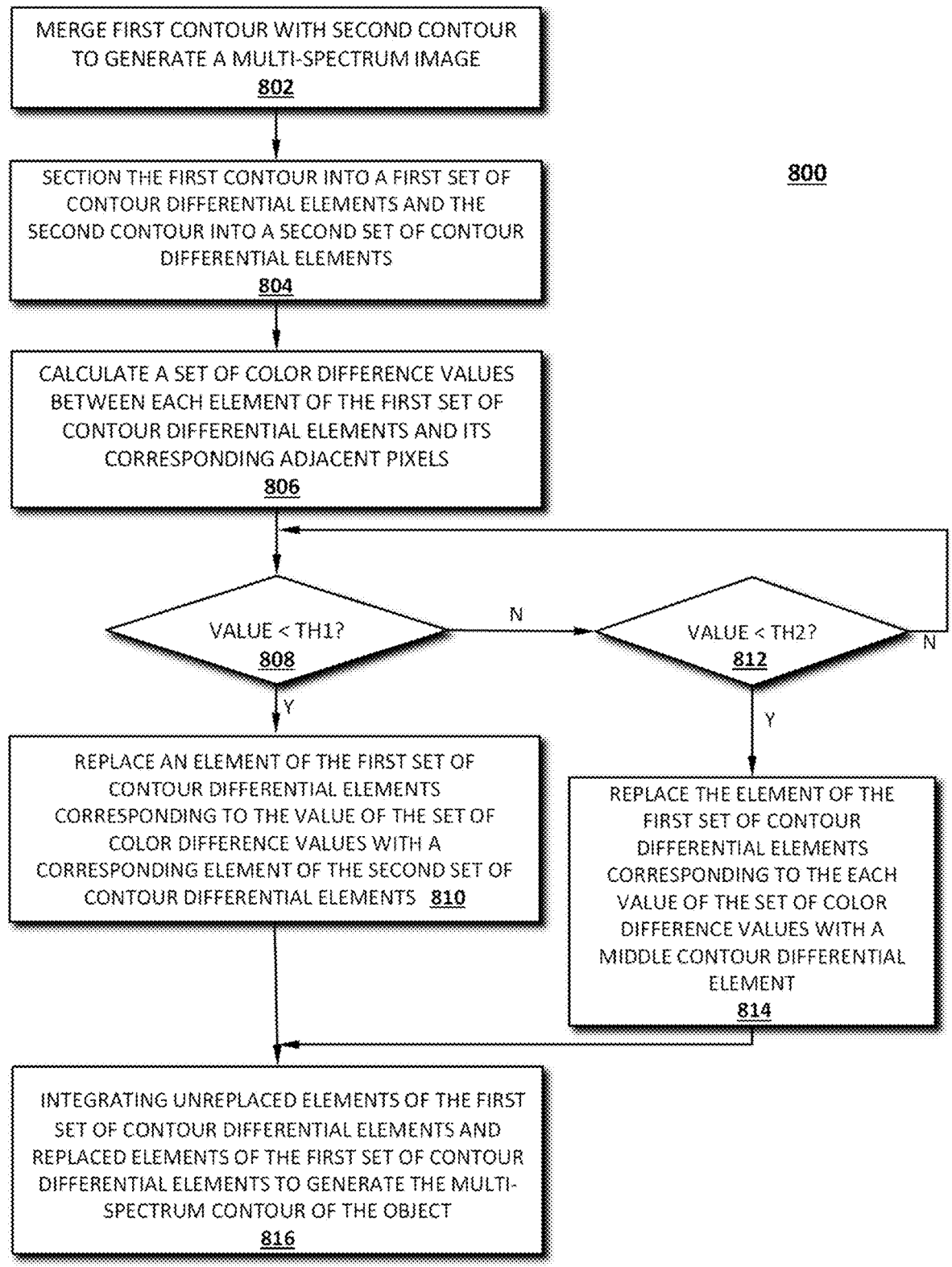
FIG. 8 depicts a flow chart illustrating an exemplary contour integrating method according to embodiments of the present disclosure.

Referring now to FIG. 8, shown is a flow-diagram illustrating an example method 800 for integrating contours, according to embodiments of the present disclosure. The exemplary method 800 depicted by the process flow chart of FIG. 8 can be implemented by a computing system such as the multi-spectrum object recognition system 400 shown in FIG. 4, by one or more processors, and/or by components in a cloud computing system as shown in FIGS. 1, 2 and 3. In some embodiments, the method 800 can be included in example method 500 depicted in FIG. 5 (e.g., at operation 506). The method 800 can be completed to integrate a first contour (e.g., based on a visible light-based image) and second contour (e.g., based on an invisible light-based image) to generate a multi-spectrum contour of an object.

Method 800 initiates at operation 802, where a first contour (e.g., of a visible light-based image) of an object and a second contour (e.g., of an invisible light-based image) of the object are merged. In embodiments, the contours can be merged such that they share the same center point.

A first contour generated based on the first image can be sectioned into a first set of contour differential elements and a second contour based on the second image can be sectioned into a second set of contour differential elements. This is illustrated at operation 804. In embodiments, the images can be sectioned based on a coordinate system in the multi-spectrum image. In embodiments, the first set of contour differential elements and the second set of contour differential elements can have a same differential element amount n and a same differential element angle Δθ based on the coordinate system.

A set of color difference values between each element of the first set of contour differential elements and its adjacent pixels (e.g., a 1-1 mapping of contour differential elements to adjacent pixels can be mapped such that color difference values can be calculated) can be calculated based on color information of the first set of contour differential elements and color information of the adjacent pixels. This is illustrated at operation 806.

A value of the set of color difference values can be compared with a first predefined color difference threshold value (TH1). This is illustrated at operation 808. In response to the value of the set of color difference values being less than the first predefined color difference threshold value ("Y" at operation 808), an element of the first set of contour differential elements (corresponding to the value less than the first predefined threshold) can be replaced with a corresponding element of the second set of contour differential elements. This is illustrated at operation 810. In embodiments, the element of the first set of contour differential elements and the corresponding element of the second set of contour differential elements can have a same deflection angle θ in the coordinate system.

In response to the value of the set of color difference values being greater than the first predefined color difference threshold value ("N" at operation 808), the value can be compared with a second predefined color difference threshold value (TH2), where the second predefined color difference threshold value is greater (TH2) is greater than the first predefined color difference threshold value (TH1).

In response to the value of the set of color difference values being less than the second predefined color difference threshold value ("Y" at operation 812), an element of the first set of contour differential elements (corresponding to the value less than the second predefined threshold) is replaced with a middle contour differential element. This is illustrated at operation 814. The position of the middle contour differential element in the multi-spectrum image can be determined based on the following factors: a position of the element of the first set of contour differential elements, a position of the corresponding element of the second set of contour differential elements, and a predefined position weight factor. In embodiments, the predefined position weight factor is related to a variation tendency of the color difference value corresponding to the element of the first set of contour differential elements.

In response to the value of the set of color difference values being greater than both of the first predefined color difference threshold value (TH1) and the second predefined color difference threshold value (TH2) ("N" at operation 812), operation 814 can be skipped and the method 800 can directly return to execute operation 808 until all color difference values in the set of color difference values have traversed operations 808-814. Thus, a next value of the set of color difference values can be iterated until all values of the set of color difference values are traversed between operations 808 and 814.

Unreplaced elements of the first set of contour differential elements and replaced elements of the first set of contour differential elements can be integrated to generate the multi-spectrum contour. This is illustrated at operation 816. In embodiments, the element of the first set of contour differential elements and the corresponding element of the second set of contour differential elements comprise one or more pixels. In embodiments, the middle contour differential element comprises one or more pixels.

Operations 808 and 814 for replacing elements according to thresholds can be completed per the matrix equation (Equation 1) presented below:

$$f\begin{pmatrix} x_1 & x_2 \\ y_1 & y_2 \end{pmatrix} = \begin{cases} \begin{pmatrix} x_1 & x_2 \\ y_1 & y_2 \end{pmatrix}_{visible\ light}, & \text{color difference value} < TH1 \\ w(t) \times \begin{pmatrix} x_1 & x_2 \\ y_1 & y_2 \end{pmatrix}_{visible\ light} + \\ (1 - w(t)) \times \begin{pmatrix} x_1 & x_2 \\ y_1 & y_2 \end{pmatrix}_{invisible\ light}, & TH1 \leq \text{color difference value} \leq TH2 \\ \begin{pmatrix} x_1 & x_2 \\ y_1 & y_2 \end{pmatrix}_{invisible\ light}, & \text{color difference value} < TH2 \end{cases} \quad (1)$$

In Equation 1, $$f\begin{pmatrix} x_1 & x_2 \\ y_1 & y_2 \end{pmatrix}$$

is a coordinate matrix presenting a contour differential element of the multi-spectrum contour of the object according to the coordinate system;

$$\begin{pmatrix} x_1 & x_2 \\ y_1 & y_2 \end{pmatrix}_{visible\ light}$$

is a coordinate matrix presenting an element of the first set of contour differential elements based on the first image according to the coordinate system;

$$\begin{pmatrix} x_1 & x_2 \\ y_1 & y_2 \end{pmatrix}_{invisible\ light}$$

is a coordinate matrix presenting an element of the second set of contour differential elements based on the second image according to the coordinate system;

TH1 is the first predefined color difference threshold value;

TH2 is the second predefined color difference threshold value;

$(x_1, y_1)$ is a position coordinate presenting an endpoint pixel of a contour differential element according to the coordinate system;

$(x_2, y_2)$ is a position coordinate presenting another endpoint pixel of a contour differential element according to the coordinate system;

w(t) is a predefined position weight factor which can be defined as:

$$w(t) = \begin{cases} 1, & \text{color difference value} < TH1 \\ et^2, & et^2 \in (0,1) \\ 0, & \text{color difference value} > TH2 \end{cases} \quad (2)$$

In Equation 2, t is a predefined variable that can quantify a degree of a color difference value compared with TH1 and TH2. In response to the color difference value being more adjacent to TH1, $et^2$ is more adjacent to 1. Conversely, in response to the color difference value being more adjacent to TH2, $et^2$ is more adjacent to 0. Therefore, the predefined position weight factor w(t) is related to a variation tendency of the color difference value corresponding to the element of the first set of contour differential elements, for instance, the variation tendency indicated by the quantified degree of the color difference value compared with the predefined color difference threshold value TH1 and TH2.

With reference now to FIG. 9, an example method for multi-spectrum visual object recognition is depicted, in accordance with embodiments of the present disclosure. The multi-spectrum object recognition system 400 may merge a natural light-based image comprising a first contour (solid outline) and an infrared-based image comprising a second contour (dashed outline) to generate a multi-spectrum image based on the same image center point which is used as the origin of a coordinate system to build the coordinate system.

The multi-spectrum object recognition system 400 may section, respectively, the first contour into a first set of contour differential elements and the second contour into a second set of contour differential elements based on the coordinate system in the multi-spectrum image. The first set of contour differential elements and the second set of contour differential elements are sectioned as the same differential element amount n and the same differential element angle $\Delta\theta$ based on the coordinate system. The multi-spectrum object recognition system 400 may calculate a set of color difference values between each element of the first set of contour differential elements, for instance, the differential element $m_1$, and adjacent pixels corresponding to each element of the first set of contour differential elements, for instance, the adjacent pixels marked in FIG. 9, based on color information of the first set of contour differential elements and color information of the adjacent pixels.

In response to a value of the set of color difference values being less than a first predefined color difference threshold value, the multi-spectrum object recognition system 400 may replace the element of the first set of contour differential elements corresponding to the value of the set of color difference values (e.g., differential element $m_1$) with a corresponding element of the second set of contour differential elements (e.g., differential element $m_2$). The element of the first set of contour differential elements and the corresponding element of the second set of contour differential elements can have a same deflection angle $\theta$ in the coordinate system.

In response to the value of the set of color difference values being greater than the first predefined color difference threshold value but being less than a second predefined color difference threshold value (where the second predefined color difference threshold value is greater than the first predefined color difference threshold value), the multi-spectrum object recognition system 400 may replace the element of the first set of contour differential elements corresponding to the value of the set of color difference values with a middle contour differential element (e.g., middle differential element $m_3$). The middle contour differential element in the multi-spectrum image is determined based on the following factors, for instance, the position of the differential element $m_1$, the position of the differential element $m_2$ and a predefined position weight factor.

Furthermore, the multi-spectrum object recognition system 400 may iterate a next value of the set of color difference values until all of the set of color difference values are traversed. Finally, the multi-spectrum object recognition system 400 may integrate unreplaced elements of the first set of contour differential elements and replaced elements of the first set of contour differential elements to generate the multi-spectrum contour of the object.

As mentioned in the above, the present disclosure provides a method, system and computer program product for multi-spectrum visual object recognition. The present disclosure may provide significant improvements on visual object recognition when objects are covered by obstacles which block visible light routes. Furthermore, the present disclosure may provide significant improvements on execution efficiency and accuracy of visual object recognition in complex scenarios where interference factors in the background influence the execution efficiency and object recognition accuracy.

It should be noted that the exemplary methods for process management according to embodiments of this disclosure could be implemented by computer system/server 12 of FIG. 1.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method comprising:
    obtaining, by one or more processors, a first image corresponding to visible light and a second image corresponding to invisible light with respect to an object;
    identifying, by the one or more processors, a first contour of the object based on the first image;
    identifying, by the one or more processors, a second contour of the object based on the second image, wherein the first contour is covered at least in part by an invisible light-transmissive obstacle and the second contour is not blocked by the invisible light-transmissive obstacle;
    integrating, by the one or more processors, the first contour of the object and the second contour of the object to generate a multi-spectrum contour of the object; and
    recognizing, by the one or more processors, the object using the multi-spectrum contour of the object.

2. The method of claim 1, wherein identifying the first contour and the second contour comprises:
    generating, by the one or more processors, respective gray histograms for the first image and the second image, wherein the gray histograms comprise gray level values and a number of pixels respectively corresponding to each of the gray level values;
    computing, by the one or more processors, a median value for each of the gray histograms;
    determining, by the one or more processors, respective ranges of the gray level values based on two predefined end values of gray level for the first image and the second image, wherein the median values of the gray level values are included within the ranges of the gray level values;
    converting, by the one or more processors, the first image into a contrast-strengthened first image and the second image into a contrast-strengthened second image based on the ranges of the gray level values and the median values of the gray level values; and
    extracting, by the one or more processors, the first contour based on the contrast-strengthened first image and the second contour based on the contrast-strengthened second image.

3. The method of claim 1, wherein integrating the first contour and the second contour to generate a multi-spectrum contour of the object comprises:
merging, by the one or more processors, the first contour and the second contour to generate a multi-spectrum image based on a same image center point;
sectioning, by the one or more processors, the first contour into a first set of contour differential elements and the second contour into a second set of contour differential elements based on a coordinate system in the multi-spectrum image;
calculating, by the one or more processors, a set of color difference values between each element of the first set of contour differential elements and its corresponding adjacent pixels based on color information of the first set of contour differential elements and color information of the adjacent pixels;
comparing, by the one or more processors, a value of the set of color difference values with a first predefined color difference threshold value; and
replacing, in response to the value being less than the first predefined color difference threshold value, by the one or more processors, an element of the first set of contour differential elements corresponding to the value with a corresponding element of the second set of contour differential elements.

4. The method of claim 3, wherein the integrating the first contour and the second contour to generate a multi-spectrum contour of the object further comprises:
comparing, in response to the value of the set of color difference values being not less than the first predefined color difference threshold value, by the one or more processors, the value of the set of color difference values with a second predefined color difference threshold value, the second predefined color difference threshold being greater than the first predefined color difference threshold; and
replacing, in response to the value of the set of color difference values being less than the second predefined color difference threshold value, the element of the first set of contour differential elements corresponding to the value of the set of color difference values with a middle contour differential element.

5. The method of claim 3, wherein the element of the first set of contour differential elements and the corresponding element of the second set of contour differential elements comprise one or more pixels.

6. The method of claim 2, wherein the identifying the first contour and the second contour further comprises:
removing, by the one or more processors, background interferences respectively in the first image and the second image based on the first contour and the second contour, wherein the background interferences are located outside of regions defined by the first contour and the second contour.

7. The method of claim 1, wherein the first image and second image have a same image center point, camera angle, and image magnification.

8. A system comprising:
a computer-readable storage medium storing instructions, which, when executed by a processor, is configured to cause the processor to perform a method comprising:
obtaining a first image corresponding to visible light and a second image corresponding to invisible light with respect to an object;
identifying a first contour of the object based on the first image;
identifying a second contour of the object based on the second image, wherein the first contour is covered at least in part by an invisible light-transmissive obstacle and the second contour is not blocked by the invisible light-transmissive obstacle;
integrating the first contour of the object and the second contour of the object to generate a multi-spectrum contour of the object; and
recognizing the object using the multi-spectrum contour of the object.

9. The system of claim 8, wherein identifying the first contour and the second contour comprises:
generating respective gray histograms for the first image and the second image, wherein the gray histograms comprise gray level values and a number of pixels respectively corresponding to each of the gray level values;
computing a median value for each of the gray histograms;
determining respective ranges of the gray level values based on two predefined end values of gray level for the first image and the second image, wherein the median values of the gray level values are included within the ranges of the gray level values;
converting the first image into a contrast-strengthened first image and the second image into a contrast-strengthened second image based on the ranges of the gray level values and the median values of the gray level values; and
extracting the first contour based on the contrast-strengthened first image and the second contour based on the contrast-strengthened second image.

10. The system of claim 8, wherein integrating the first contour and the second contour to generate a multi-spectrum contour of the object comprises:
merging the first contour and the second contour to generate a multi-spectrum image based on a same image center point;
sectioning the first contour into a first set of contour differential elements and the second contour into a second set of contour differential elements based on a coordinate system in the multi-spectrum image;
calculating a set of color difference values between each element of the first set of contour differential elements and its corresponding adjacent pixels based on color information of the first set of contour differential elements and color information of the adjacent pixels;
comparing a value of the set of color difference values with a first predefined color difference threshold value; and
replacing, in response to the value being less than the first predefined color difference threshold value an element of the first set of contour differential elements corresponding to the value with a corresponding element of the second set of contour differential elements.

11. The system of claim 10, wherein integrating the first contour and the second contour to generate a multi-spectrum contour of the object further comprises:
comparing, in response to the value of the set of color difference values being not less than the first predefined color difference threshold value the value of the set of color difference values with a second predefined color difference threshold value, the second predefined color difference threshold being greater than the first predefined color difference threshold; and
replacing, in response to the value of the set of color difference values being less than the second predefined color difference threshold value, the element of the first set of contour differential elements corresponding to the value of the set of color difference values with a middle contour differential element.

12. The system of claim 10, wherein the element of the first set of contour differential elements and the corresponding element of the second set of contour differential elements comprise one or more pixels.

13. The system of claim 9, wherein the identifying the first contour and the second contour further comprises:
removing background interferences respectively in the first image and the second image based on the first contour and the second contour, wherein the background interferences are located outside of regions defined by the first contour and the second contour.

14. A computer program product comprising one or more computer readable storage media having program instructions collectively embodied therewith, the program instructions executable by one or more processors to cause the one or more processor to perform a method comprising:
obtaining a first image corresponding to visible light and a second image corresponding to invisible light with respect to an object;
identifying a first contour of the object based on the first image;
identifying a second contour of the object based on the second image, wherein the first contour is covered at least in part by an invisible light-transmissive obstacle and the second contour is not blocked by the invisible light-transmissive obstacle;
integrating the first contour of the object and the second contour of the object to generate a multi-spectrum contour of the object; and
recognizing the object using the multi-spectrum contour of the object.

15. The computer program product of claim 14, wherein identifying the first contour and the second contour comprises:
generating respective gray histograms for the first image and the second image, wherein the gray histograms comprise gray level values and a number of pixels respectively corresponding to each of the gray level values;
computing a median value for each of the gray histograms;
determining respective ranges of the gray level values based on two predefined end values of gray level for the first image and the second image, wherein the median values of the gray level values are included within the ranges of the gray level values;
converting the first image into a contrast-strengthened first image and the second image into a contrast-strengthened second image based on the ranges of the gray level values and the median values of the gray level values; and
extracting the first contour based on the contrast-strengthened first image and the second contour based on the contrast-strengthened second image.

16. The computer program product of claim 14, wherein integrating the first contour and the second contour to generate a multi-spectrum contour of the object comprises:
merging the first contour and the second contour to generate a multi-spectrum image based on a same image center point;
sectioning the first contour into a first set of contour differential elements and the second contour into a second set of contour differential elements based on a coordinate system in the multi-spectrum image;
calculating a set of color difference values between each element of the first set of contour differential elements and its corresponding adjacent pixels based on color information of the first set of contour differential elements and color information of the adjacent pixels;
comparing a value of the set of color difference values with a first predefined color difference threshold value; and
replacing, in response to the value being less than the first predefined color difference threshold value an element of the first set of contour differential elements corresponding to the value with a corresponding element of the second set of contour differential elements.

17. The computer program product of claim 16, wherein integrating the first contour and the second contour to generate a multi-spectrum contour of the object further comprises:
comparing, in response to the value of the set of color difference values being not less than the first predefined color difference threshold value the value of the set of color difference values with a second predefined color difference threshold value, the second predefined color difference threshold being greater than the first predefined color difference threshold; and
replacing, in response to the value of the set of color difference values being less than the second predefined color difference threshold value, the element of the first set of contour differential elements corresponding to the value of the set of color difference values with a middle contour differential element.

18. The computer program product of claim 16, wherein the element of the first set of contour differential elements and the corresponding element of the second set of contour differential elements comprise one or more pixels.

\* \* \* \* \*